United States Patent [19]
van den Berg

[11] 3,889,037
[45] June 10, 1975

[54] MULTIPLE-LAYERED, WELDABLE PADDED ELEMENT

[75] Inventor: Heinz van den Berg, Hennef, Stadt Blankengerg, Germany

[73] Assignee: Dynamit Nobel Aktiengesellschaft, Germany

[22] Filed: May 16, 1974

[21] Appl. No.: 470,586

[30] Foreign Application Priority Data
May 16, 1973   Germany............................ 2324615

[52] U.S. Cl. ................ 428/302; 428/314; 428/315; 161/124
[51] Int. Cl. .............................................. B32b 3/26
[58] Field of Search ....... 161/43, 44, 118, 122, 124, 161/160, 254

[56] References Cited
UNITED STATES PATENTS

| | | | |
|---|---|---|---|
| 3,389,043 | 6/1968 | Clark .................................... | 161/43 |
| 3,647,607 | 3/1972 | Hillers................................ | 161/122 |
| 3,725,190 | 4/1973 | Bostick .............................. | 161/160 |
| 3,785,913 | 1/1974 | Hallamore .......................... | 161/160 |

*Primary Examiner*—William J. Van Balen
*Attorney, Agent, or Firm*—Craig & Antonelli

[57] ABSTRACT

A multiple-layered padded element weldable in a high-frequency field, for example for use in the automobile industry, includes a layer of PVC foam material provided between a cover layer of a thermoplastic synthetic resin film, and a dimensionally stable bottom layer. The bottom layer is optionally coated with an auxiliary polymeric welding agent and another layer is provided between the PVC foam layer and the dimensionally stable bottom layer. This other layer is joined to the layer of PVC foam material and comprises a welding wad of fibrous material wetted on its surface with a dispersion of a mixture of polyvinyl chloride and polyvinyl acetate.

5 Claims, 1 Drawing Figure

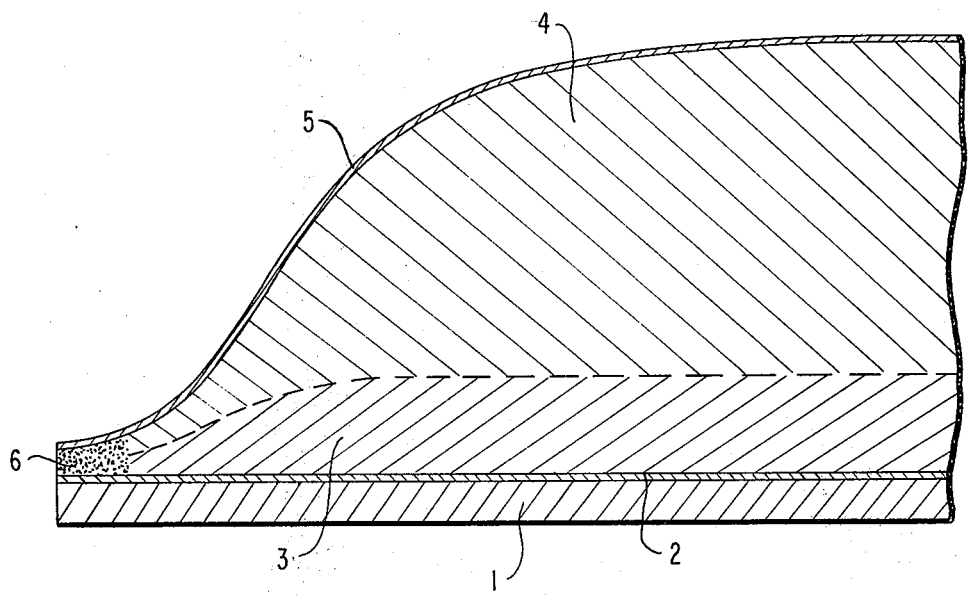

MULTIPLE-LAYERED, WELDABLE PADDED ELEMENT

The present invention relates to a multiple-layered padded element weldable in a high-frequency electrical field, for example for the automobile industry, with a layer of PVC foam material provided between a cover layer of a thermoplastic synthetic resin film, e.g., of PVC, and a dimensionally stable bottom layer, for example, of cardboard or the like, optionally coated with an auxiliary welding agent or flux.

In the automobile industry, such padded elements produced from composite materials are utilized for padding purposes, for example for doors or the like. In this connection, it is customary to apply a weldable layer of foam material, e.g., of soft PVC foam, to a firm substrate, for example a cardboard sheet optionally additionally coated with an auxiliary welding agent, and to cover this first-mentioned weldable layer of foam material with a likewise weldable synthetic resin film, for example a biaxially stretched PVC film. This so-called padded element is then welded by means of high-frequency energy along its edges and also optionally with intermediate seams. It has now been found that the quality of the weld seams of the soft PVC foam material on cardboard is relatively restricted in its stress-bearing ability, especially in that the seams can no longer withstand, in particular, the shrinking stresses of the PVC film occurring at higher temperatures starting with approximately 80° C., so that there is the danger in such a case that the weld seams rupture. It is an object of the present invention to overcome this deficiency and to provide a multiple-layered padded element, weldable in a high-frequency field, wherein the weld seam has a higher strength and an improved stress-bearing ability.

Therefore, it is contemplated in accordance with this invention to provide, between the PVC foam layer and the dimensionally stable substrate, a layer joined to the layer of PVC foam material, which layer consists of a welding wad of fibrous material wetted on its surfaces with a PVC-PVAC dispersion (i.e., polyvinyl chloride-polyvinalacetate dispersion). Thus, in the composite material utilized in accordance with this invention, the PVC foam material employed is no longer disposed directly on the dimensionally stable support, i.e., the cardboard, but rather is present only between the welding wad and the synthetic outmost resin film, whereas the welding was rests directly on the substrate. In this way, a flawless welding bond is ensured between the PVC film and the PVC foam, on the one hand, but, on the other hand, an excellent and well stressable adhesion of the weld seam to the cardboard is attained due to the fact that the welding wad is pressed into the cardboard during the welding step in the manner of an anchor-type connection. Particularly at higher temperatures, e.g., 70°C. the shrinking stresses of the covering synthetic resin film are compensated for and rupturing of the weld seam is avoided. The exclusive use of a welding wad without the PVC foam would not satisfy the requirements of the padding of the padded element, since the welding wad does not exhibit sufficient dimensional stability. Here, the composite material provided by this invention provides the advantage that, on the one hand, the high qualities of the PVC foam material are exploited for the padding operation, but, on the other hand, the improved adhesive strength and tenacity of the weld seam are utilized by the additional use of the welding wad.

In a further development of the invention, it is suggested to employ, for the welding wad, infusible fibers, such as cellulose fibers, acrylic fibers, cellulose acetate fibers, or the the like. It is advantageous to compose the welding wad of about 50 percent by weight of fibers and 50 percent by weight of PVC-PVAC, i.e., a mixture of PVC and PVAC resulting in the removal of the dispersant from the dispersion. However, proportions different from the above are also possible within the scope of this invention; for example, it is possible to use about 60 percent by weight of fibers and 40 percent by weight of PVC-PVAC. The PVC-PVAC component can be applied to the fibers by spraying. For spraying purposes, a dispersion is utilized, for example, which contains about 65 percent solid components made up of PVC-PVAC and 40 percent of a dispersant, i.e., water. The PVC proportion represents the proportion of welding agent, while the PVAC proportion is the film-forming proportion of the dispersion. In this connection, the film-forming PVAC proportion should be about 15 percent by weight of the solid mixture of PVC-PVAC. A range of from 10 to 25 percent by weight of PVAC in the mixture is also suitable. The PVC proportion is from 90 to 75 percent of the mixture. The solid components, i.e., the mixture of PVC and PVAC in the dispersion can vary from 50 to 80 percent. This sprayed-on dispersion renders the cellulose fibers weldable, wherein the sprayed-on PVC-PVAC proportions of the dispersion adheres uniformly to the wad, and the dispersant is removed by vaporization.

It is furthermore suggested to join the PVC foam material in the form of panels with the welding wad, likewise provided in panel form, prior to use, to produce the finished padded element, so that only one composite material is to be processed. The joining of the foam panel with the welding wad panel can be effected, for example, by withdrawing the two materials from the two reels and combining these materials into one sheet, during which step the welding wad is heated with infra-red radiators to about 120°C., so that the synthetic resin proportions are slightly initially melted, whereupon the two sheets are united and the pressure required to hold the sheets together and join them is produced by the windup pressure during the reeling up of the composite sheet onto a further reel.

The invention is shown in the accompanying drawing with reference to one embodiment thereof and will be explained in greater detail below.

The drawing shows a fragmentary cross-sectional view of a multiple-layered padded element. The firm, dimensionally stable substrate or support 1, for example cardboard, is suitably provided with a thin layer of a welding agent or flux 2, for example by spraying. Since, in the proposed padded element, synthetic resins weldable in a high-frequency field, such as PVC film, PVC foam, etc., are essentially employed, the welding agent sprayed thereon is, for example, a dispersion of PVC-PVAC, i.e., a mixture of 85 percent polyvinyl chloride (PVC) and 15 percent of polyvinyl acetate. This dispersion for spraying onto the stable substrate contains, for example, 50–55 percent solid components in a solvent such as water. Approximately 40–60 g. of dispersion per square meter is applied by spraying. The dimensionally stable substrate suitably pretreated in this way is then covered by the composite sheet 3, 4 of a layer of foam material, e.g., soft PVC foam 4 and welding wad or mat 3, consisting of 50 percent of cellulose fibers and 50 percent by weight of sprayed-on PVC-PVAC. The specific gravity of the welding wad employed can be quite different, depending on the degree of compacting of the wad, but a welding wad having a specific gravity of about 8 to 14 kg. per m³ is preferred. The length of the fibers in the wad must not be chosen to be too small; such length can range, for example, around 20 mm generally from 20 to 40 mm is suitable. The synthetic resin film 5, for example a biaxially stretched PVC film, is placed on the topside, as a cover for the foam material 4, on the composite layer of foam material 4 and welding wad 3. The thus-prestacked padded element is subsequently welded together in a high-frequency field, as indicated by the weld seam 6 at the edge of the padded element.

Consequently, it is possible by means of the padded element as provided by this invention to produce an article having high dimensional stability and capable of withstanding great stresses, which article is further distinguished by the use of materials weldable in a high-frequency field, so that an economical manufacture is made possible.

The fiber proportions in the welding wad may be between 20 and 70 percent by weight and the solid PVC and PVAC components which are sprayed on can amount to 70 – 30 percent by weight. In addition to the fibers already mentioned, other suitable fibers are wool fibers, cotton fibers, hemp fibers, etc. The term "infusible fibers" means that the fibers will not melt, disintegrate or burn at the temperatures used for the process.

Apart from cardboard, the support can also be made of a textile tissue, e.g., gauze, web or fabric or bonded fabric.

With the prior art heretofore mentioned in the specification, shrinking stresses occur in the case of normal stretched sheets which are heated to temperatures in excess of 80° during use. As a result, the welded seams often begin to tear. In the case of the invention, this rupturing of the seams when the elements are employed at temperatures in excess of 60° or 70°C. is avoided by the additional mechanical anchoring of the infusible fiber components. Thus, this means that substantially improved stress-bearing weld seams can be obtained by the invention.

While the novel embodiments of the invention have been described, it will be understood that various omissions, modifications and changes in these embodiments may be made by one skilled in the art without departing from the spirit and scope of the invention.

What is claimed is:

1. A multiple-layered padded element weldable in a high-frequency field, for example for use in the automobile industry, comprising a layer of PVC foam material provided between a cover layer of a thermoplastic synthetic resin film, and a dimensionally stable bottom layer, optionally coated with an auxiliary polymeric welding agent, and a layer provided between the PVC foam layer and the dimensionally stable bottom layer, said layer being joined to the layer of PVC foam material and comprising a welding wad of fibrous material wetted on its surface with a dispersion of a mixture of polyvinyl chloride and polyvinyl acetate.

2. The padded element according to claim 1, wherein the welding wad is produced from infusible cellulose fibers, acrylic fibers, or the like fibrous polymeric material.

3. The padded element according to claim 1, wherein the welding wad consists of about 50 percent by weight of fibers and 50 percent by weight of the mixture of polyvinyl chloride and polyvinyl acetate, said mixture containing at least 10 percent by weight of polyvinyl acetate.

4. The padded element according to claim 1, wherein the PVC foam material in the form of panels is joined with firm adherence to the likewise panel-type welding wad, by an initial melting of the synthetic resin components caused by infrared radiators.

5. The padded element according to claim 1, wherein the cover layer is made of PVC film, the bottom layer is cardboard.

* * * * *